United States Patent
Maria

(10) Patent No.: US 12,101,121 B2
(45) Date of Patent: Sep. 24, 2024

(54) MOBILE TELECOMMUNICATIONS NETWORK ACCESS POINT CONFIGURATION AND FIBER ROUTING CONFIGURATION FOR CUSTOMER PREMISES EQUIPMENT

(71) Applicant: AT&T Mobility II LLC, Atlanta, GA (US)

(72) Inventor: Arturo Maria, Bellevue, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 113 days.

(21) Appl. No.: 17/891,031

(22) Filed: Aug. 18, 2022

(65) Prior Publication Data
US 2024/0063909 A1    Feb. 22, 2024

(51) Int. Cl.
*H04B 10/2575* (2013.01)

(52) U.S. Cl.
CPC .............. *H04B 10/25753* (2013.01)

(58) Field of Classification Search
None
See application file for complete search history.

(56) References Cited

U.S. PATENT DOCUMENTS

| | | | | |
|---|---|---|---|---|
| 5,513,171 A * | 4/1996 | Ludwiczak | ......... | H04M 3/2254 370/254 |
| 5,890,055 A * | 3/1999 | Chu | ..................... | H04B 7/2606 455/21 |
| 6,323,980 B1 * | 11/2001 | Bloom | ................ | H04W 88/085 398/116 |
| 7,003,321 B2 * | 2/2006 | Aburakawa | ...... | H04B 10/25753 455/550.1 |
| 8,543,008 B2 * | 9/2013 | Soto | ....................... | H04B 10/27 398/171 |
| 9,807,391 B2 * | 10/2017 | Panchagnula | ...... | H04N 21/8456 |
| 10,070,348 B2 * | 9/2018 | Begen | ..................... | H04L 69/14 |
| 10,075,779 B2 * | 9/2018 | Erreygers | ........ | H04B 10/25752 |
| 10,193,791 B2 * | 1/2019 | Nakatsugawa | ......... | H04L 45/22 |
| 10,735,995 B1 * | 8/2020 | Pocha | ............... | H04W 28/0263 |
| 10,778,334 B2 * | 9/2020 | Ross | ...................... | H04B 10/27 |
| 11,051,242 B2 * | 6/2021 | Meredith | .............. | H04W 48/20 |

(Continued)

OTHER PUBLICATIONS

Medhi, Von Neumann Architecture, 2012 (Year: 2012).*
Wikipedia, 3GPP, 2021 (Year: 2021).*

*Primary Examiner* — Jai M Lee
(74) *Attorney, Agent, or Firm* — GUNTIN & GUST, PLC; Mark Wilinski

(57) ABSTRACT

Mobile telecommunications network access point configuration and fiber routing configuration for customer premises equipment is disclosed. A customer premises component (CPE) can comprise a customer premises mobile broadband to steerable fiber component (CPC) comprising a baseband control unit, a user-plane function component, and a fiber path selection component that can enable configuration of a cellular frontend facing a user equipment (UE) and configuration of a fiber backend facing other endpoint devices. The CPC can receive information pertinent to the configuring the frontend/backend from a network management component, a carrier network component, and internet component, etc. The CPC can automatically adapt configuration of the frontend/backend to selectively enable traffic to flow between the UE and another endpoint device.

20 Claims, 10 Drawing Sheets

(56) References Cited

U.S. PATENT DOCUMENTS

| | | | |
|---|---|---|---|
| 11,159,943 B2 * | 10/2021 | Shah | H04L 63/1466 |
| 11,197,238 B2 * | 12/2021 | Zhu | H04W 48/18 |
| 11,206,715 B2 * | 12/2021 | Pocha | H04W 28/24 |
| 11,399,305 B2 * | 7/2022 | Barchi | H04L 45/124 |
| 2009/0116393 A1 * | 5/2009 | Hughes | H04L 45/124 |
| | | | 370/238 |
| 2020/0267513 A1 * | 8/2020 | Zhu | H04L 65/1033 |
| 2021/0167908 A1 * | 6/2021 | Khalid | H04L 5/14 |
| 2022/0141708 A1 * | 5/2022 | Arrobo Vidal | H04L 69/22 |
| | | | 370/329 |

* cited by examiner

MOBILE TELECOMMUNICATIONS NETWORK ACCESS POINT CONFIGURATION AND FIBER ROUTING CONFIGURATION FOR CUSTOMER PREMISES EQUIPMENT

TECHNICAL FIELD

The disclosed subject matter relates to customer premises equipment (CPE) supporting cellular connectivity, and, for example, to automating configuration of a CPE with regard to configuration of mobile telecommunications network access point connectivity, such as, but not limited to, configuration of a cellular CPE, and configuration of packet routing via fiber optic connection(s).

BACKGROUND

Increasingly, customer premises equipment (CPE) is enabling private mobile telecommunications network access point connectivity, e.g., private cellular network(s), providing cellular coverage to a customer premises that can have a much smaller coverage area than that typically associated with conventional radio access network (RAN) network(s) of large carriers, e.g., microcellular RAN towers, etc. CPE(s) can be compliant with 3RD GENERATION PARTNERSHIP PROJECT (3GPP) standards, e.g., 4G, 5G, 6G, etc. Whereas WI-FI networks deployed today are typically limited by speed, frequencies that can be used, interference, throughput, and other factors, CPE(s) can foreseeably eventually replace the Wi-Fi networks that are so common today. Configuration of CPE(s) can be complicated and difficult for customers. Moreover, CPE configuration can entail deployment of trained experts to provide local troubleshooting at a customer premises, provide proper provisioning, coordinate spectrum management, set up routing of network alerts, etc. These difficulties can increase market friction and slow adoption of CPE(s), even where connection performance can be otherwise improved for a customer by employing a CPE.

DETAILED DESCRIPTION

Figure 1:
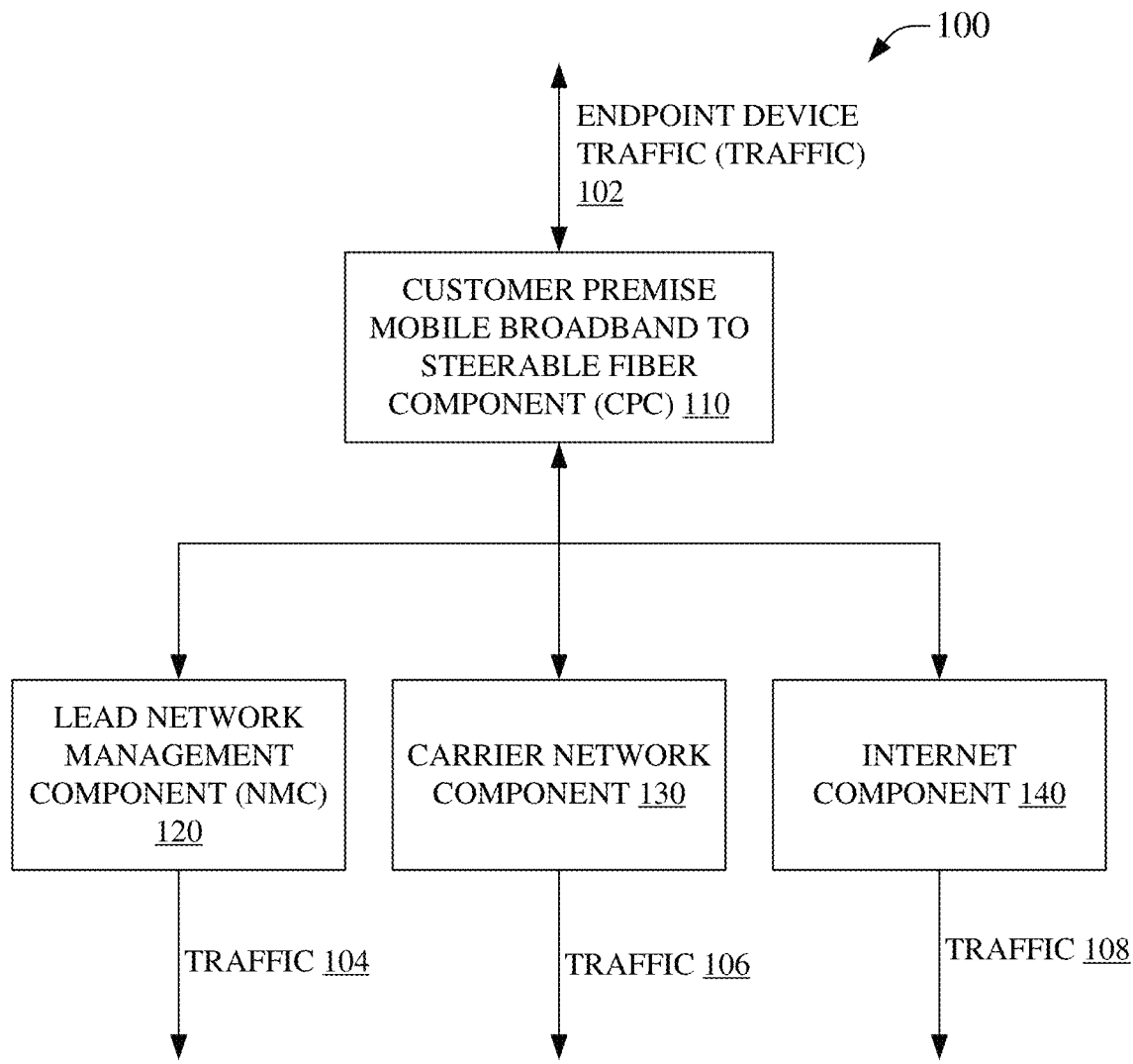
FIG. 1 is an illustration of an example system that can facilitate configuration of customer premises equipment (CPE), in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As noted above, customer premises equipment (CPE) can provide private mobile telecommunications network access point connectivity, e.g., private cellular network(s). For convenience, a private mobile telecommunications network enabled by a CPE is generally referred to as a customer cellular, CPE cellular, home cellular, or other such similar term that is intended to distinguish these customer-level cellular-type wireless networks from conventional macro-level cellular systems typically associated with carriers systems, mobile virtual network operator (MVNOs) systems, etc. Providing cellular coverage to a customer premises, e.g., via a home cellular connection, can accordingly have a much smaller coverage area than those typically associated with conventional macro-cellular system devices, e.g., via a conventional RAN network of a large carrier, MVNO, etc. A home cellular connection via a CPE can be compliant with various 3GPP standards, e.g., 4G, 5G, 6G, etc. Given the ubiquity of modern cellular enabled devices, e.g., cell phones, cellular enabled watches, cellular enabled tablet computers, cellular cards or cellular enabled laptops or other computers, etc., and in view of the many limitations of conventional WI-FI networks, e.g., typically limited speed, limited frequencies, resulting interference, reduced throughput, and other factors, home cellular can be viewed as a likely path for future wireless connectivity. CPEs, for example, can be deployed in many homes in a neighborhood, across buildings in a corporate campus, etc., and can provide a blanket of 5G wireless connectivity without the limitations associated with typically WI-FI. Moreover, a cellular connection between a user equipment (UE) and a CPE can be paired with a physical connection between the CPE and another component of a network connecting the UE and another end point device. As an example, the CPE can receive data from a UE and the CPE can connect via one or more fiber optic cables to another component, typically of an external network, to carry data form the CPE towards another end point device. In other examples, the CPE can connect to external networks via a copper wire, via a wireless link, etc. However, for simplicity, the presently disclosed subject matter will be discussed in terms of the CPE connecting to an external network via fiber optics, although other types of connection between a CPE and an external network are to be considered within the scope of the instant disclosure.

CPE(s) can be deployed by trained experts that can provide local troubleshooting at a customer premises, provide proper provisioning, coordinate spectrum management, set up routing of network alerts, etc. However, the presently disclosed subject matter details CPE(s) that can support automated provisioning, troubleshooting, and maintenance. This can improve acceptance of and adoption of CPE(s). Moreover, the presently disclosed subject matter enables automation of fiber routing to distribute fiber routing to customer locations and away from more conventional carrier core network fiber routing components, e.g., a fiber provider datacenter, etc. Fiber routing, more especially automated fiber routing can enable responsively directing packets, e.g., data traffic, to the other end point device across an external network, via a carrier core data center, via a proposed network management component(s) that serves groups of CPEs, etc. Furthermore, automating fiber routing local to customer premises can enable localized troubleshooting, localized provisioning, localized spectrum management and routing of network alerts, etc. Carrier(s) can then deploy and support CPEs from a distance, e.g., via a carrier network component, via the proposed network management component(s), across a common packet network, over the air, etc. This can offload management responsibilities from the customer, e.g., by automating carrier management of a CPE(s) on behalf of the customer. As an example, a newly deployed CPE can default to connecting to a lead network management component (NMC), e.g., NMC 120-620, etc., to collect provisioning information relevant to the customer premise location, such as can be obtained from customer account information associated to an identifier of the CPE communicated to the lead NMC. In this example, the NMC can determine what other CPEs are located near the customer premises and provide cellular provisioning information that can reduce interference with those nearby CPEs. Moreover, in this example, the NMC can provide information on fiber connection performance, external network, etc., that can enable the CPE to route packets with greater efficacy and efficiency than where the NMC does not provide this information, e.g., the NMC can be aware of a partial network outage and can provide the CPE information enabling the CPE to route outbound packets around the outage, which can be done, in this example, without relying on a carrier network core device to perform the improved routing. Numerous other benefits of a cellular-to-fiber CPE with automated configuration, e.g., provisioning, management, troubleshooting, routing, etc., can be readily appreciated, and all such benefits are to be considered within the scope of the instant disclosure even where not explicitly recited for the sake of clarity and brevity.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

FIG. 1 is an illustration of a system 100, which can facilitate configuration of customer premises equipment (CPE), in accordance with aspects of the subject disclosure. System 100 can comprise customer premise mobile broadband to steerable fiber component (CPC) 110. CPC 110 can be a CPE, can be comprised in a CPE, etc. CPC 110 can enable communication to/from a UE, e.g., as endpoint device traffic (traffic) 102. CPC 110 can facilitate provisioning of CPE cellular resources to enable a UE to connect with and communicate via an external network(s) with another endpoint device, for example a remotely located server, etc. In some embodiments, other endpoint devices can be on a customer premises local network, for example where CPC 110 is connected to a local network, traffic 102 can be communicated to/from other devices attached to the local network. In this regard, a UE, such as a smartphone, can connect to the local network, for example, via a 5G connection configured by CPC 110 for a CPE that is connected to an example network local to the CPE.

In embodiments, a CPC 110 can communicate with external networks via one or more optical fibers, hereinafter 'a fiber(s)'. As an example, a homeowner can have a fiber connected to a CPE and CPC 110 can provide cellular connectivity to a UE(s) such that data packets can be communicated to external networks via the example fiber. In another example, a corporate customer can employ multiple fibers for communication to one or more local and/or external networks. In this example, CPC 110 can configure CPE-level cellular connections for UEs and can configure the example multiple fibers to communicate data to/from the other external and local networks.

Where CPC 110 can configure multiple fibers, data packets of traffic 102 can be steered to particular fibers based on numerous parameters. As an example, a first fiber can demonstrate poorer performance than a second fiber, whereby CPC 110 can steer more portions of traffic 102 to the second fiber as preferential to the first fiber. As another example, a first fiber can be dedicated to carrying data corresponding to a second building on the customer premises, e.g., computing equipment of a first and second building can be connected by the dedicated example first fiber, whereby, CPC 110 can steer portions of traffic 102 for the second building to the dedicated example first fiber while other portions of traffic 102 are steered to other fibers. As yet another example, a first fiber can be connected with equipment operated by a first fiber operator that has higher fees than a second fiber of a second fiber operator, whereby CPC 110 can configure data packet steering for traffic 102 to preferentially use the second fiber at a lower cost except where it is determined or indicated that the higher cost fiber is acceptable for a portion of traffic 102 that can then be steered to the first fiber. Steering of traffic can be by updating routing tables, alter data packet headers, encapsulation of a data packet in a wrapper with alternate routing data, etc. Numerous factors can influence steering of portions of traffic 102, e.g., routing of data packets, and all such factors cannot reasonably be recited in the instant application, however all such factors are considered within the scope of the instant disclosure even where not recited for the sake of clarity and brevity.

Where CPC 110 configures one fiber, instead of multiple fibers, steering of data packets can still be performed. In these embodiments, a signal fiber connected to a CPE, e.g., CPC 110, can terminate at a fiber datacenter and routing of data packets can be performed by steering the packets to a next network component after the fiber datacenter. As an example, a local utility company can provide a fiber between the CPE and their datacenter, which can forward traffic 102 to one or more carrier networks, to one or more webservers, to other fibers, etc. As such, in this example, CPC 110 can provide packet routing information to portions of traffic 102 that cause the example utility company fiber datacenter to forward data packets according to a configuration(s) implemented by CPC 110. This can allow, for example, cellular voice portions of traffic 102 to be routed via the example utility company fiber to a carrier network while social media portions of traffic 102 can be routed to an internet server then on to a social media server. As in configuration of multiple fibers, configurations of single fiber packet steering can be premised on nearly a limitless number of factors, for example, type of data carried in the packet, an identity of a UE originating a portion of traffic 102, network performance or conditions, monetary or other costs of data packet routes or portions thereof, etc. As an example, CPC 110 can determine that packets routed to a first network device via the example utility company fiber datacenter can have lesser performance than packets routed to a second network device via the example utility company fiber datacenter and, accordingly, can update a CPC 110 configuration to steer more of traffic 102 to the example second network device via the example utility company fiber datacenter to improve performance of the connection configured by CPC 110 even where there is only a single fiber connection.

In some embodiments, a CPE corresponding to CPC 110 can have other backend modalities, e.g., connections between a CPE and equipment outside of a customer premises, etc., in addition to, or in lieu of, a fiber(s) connection to an external network component(s). As an example, a CPE can have a fiber backend connection, a wireless broadband backend connection, and a copper wire broadband backend connection. In this example, CPC 110 can automatically configure routing of packets among the available backend connections in a manner similar to that disclosed elsewhere herein for one or more fiber connections, e.g., some portions of traffic 102 can be routed via the example wireless broadband backend connection where for example the fiber connection becomes unavailable, begins performing poorly, etc.

CPC 110 can communicate with lead network management component (NMC) 120. In embodiments, lead NMC 120, hereinafter just 'NMC' for clarity and brevity unless otherwise indicated in relation to other NMCs, can correspond to one or more groups of CPCs. As such, NMC 120 can pass information to CPC 110 germane to CPC 110 configuring a corresponding CPE, e.g., configuring a frontend customer premise mobile broadband connection(s), hereinafter a 'frontend' or similar, and/or configuring steering of portions of traffic 102 via a backend customer premises fiber(s), etc., hereinafter a 'backend' or similar. As an example, NMC 120 can determine spectrum employed, reserved, etc., proximate to CPC 110 and can provide corresponding information to CPC 110 to enable CPC 110 to configure the frontend to fit into the proximate spectral landscape, e.g., to avoid in-use frequencies nearby, etc. As another example, NMC 120 can receive information reported form other CPCs, from a carrier network component, etc., that a portion of an external network is underperforming, whereby NMC 120 can inform CPC 110 of the poorly performing portion of the example external network so that CPC 110 can update a backend configuration to preferably avoid use of the underperforming portion of the external network by, for example, steering traffic 102 to other portions of the external network that can have better performance. CPC 110 can similarly communicate network alerts, frontend and/or backend network metrics, or nearly any other relevant data to NMC 120. As an example, CPC 110 can determine that an initially configured frontend frequency, indicated as preferable by NMC 120 based on nearby spectral usage, is dropping connection to a UE, such as due to the frequency being perturbed by a thick concrete wall at the customer premises. In this example, CPC 110 can select a better performing frequency, and report the underperforming frequency and report the new better performing frequency to NMC 120. In this example, NMC 120 can update a spectrum map and can then inform other proximate CPCs of the updated spectrum use, which can result in the other CPCs also automatically updating their corresponding frontends to accommodate the need of example CPC 110 to use the better performing frequency in lieu of the example initially configured frequency that was underperforming.

In embodiments, CPC 110 can communicate with carrier network component 130. In this regard, carrier network component 130, similar to NMC 120, can provide information relevant to CPC 110 configuring a frontend and/or backend. Likewise, in some embodiments, CPC 110 can communicate with internet component 140 that can provide information relevant to CPC 110 configuring a frontend and/or backend. As one or many possible examples, an internet server, e.g., internet component 140, can provide information indicating high traffic levels, whereby, CPC 110 can steer portions of traffic 102 to a redundant server having lower traffic levels.

In embodiments, CPC 110 can steer portions of traffic 102, e.g., via one or more fibers, to NMC 120, carrier network component 130, internet component 140, or any combination thereof, to enable furthered communication as traffic 104, 106, 108, etc., as illustrated. As an example, traffic 102 can typically pass from UE to CPE over the air, then pass from CPE to internet component 140, such as a fiber datacenter, via a first fiber and be directed to another endpoint as traffic 108 via a second fiber from the fiber datacenter. In this example, the second fiber can be experiencing a high volume of traffic and can be underperforming. CPC 110 can steer traffic 102, for example based on user input that traffic 102 is for a multiplayer game that is intolerant to lower performance, to pass from the example fiber data center to carrier network component 130 via a third fiber rather than accept the continued routing of data via the lesser performing second fiber of the example datacenter. In some embodiments, CPC 110 can be affiliated with a carrier entity corresponding to carrier network component 130, which, for example, can offer priority to the example multiplayer game traffic routed over the third fiber. In this example, other traffic passing through the example fiber datacenter can be unaffiliated with the carrier and can be rejected by the carrier in favor of carrying traffic 102 from CPC 110 albeit passed to carrier network component 130 via internet component 140 in this example. In some embodiments, such as where a cellular backend is available, where CPC to internet component 140 is underperforming via a fiber, traffic 102 can be rerouted by CPC 110 to carrier network component 130 via the cellular backend. Moreover, in some embodiments, traffic from multiple CPCs can be communicated by fiber to a traffic aggregator, not illustrated, that can then employ an over the air connection to carrier network component 130, for example, a remote small town can route fiber between CPCs deployed in the small town and a local traffic aggregator device acting as a repeater and having an over the air connection to a wireless carrier network, which can allow CPC 110 to connect to the repeater over fiber and the repeater to connect to a carrier network and beyond, e.g., as traffic 106, via an over the air connection. In some embodiments, traffic 102 can be communicated via MNC 120 as traffic 104, which can be configured by CPC 110 in a manner similar to other routing disclosed herein.

Figure 2:
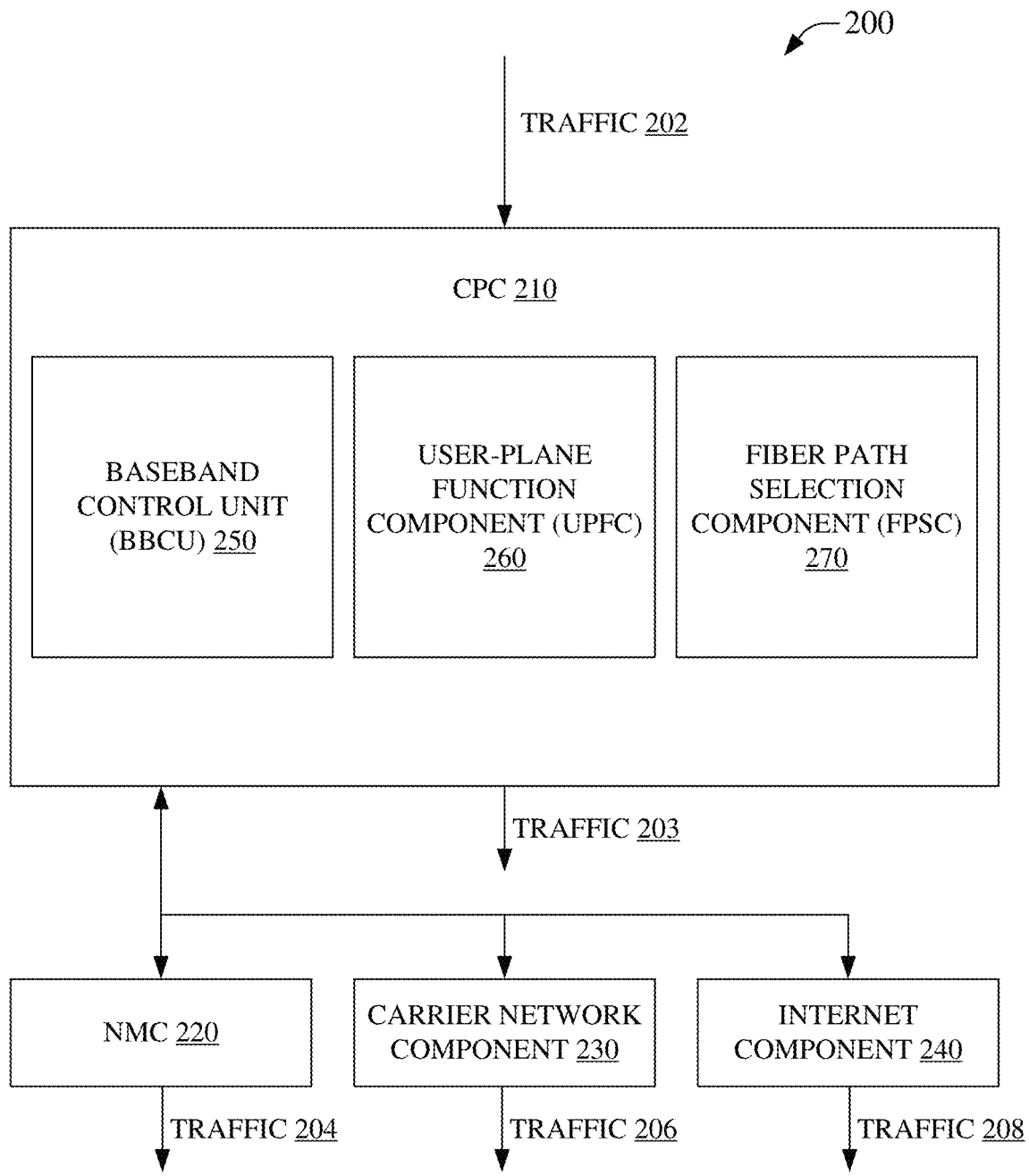
FIG. 2 is an illustration of an example system that can facilitate configuration of a customer premises equipment (CPE) baseband control unit component (BBCU), user-plane function component (UPFC), and fiber path selection component (FPSC), in accordance with aspects of the subject disclosure.

FIG. 2 is an illustration of a system 200, which can enable configuration of a customer premises equipment (CPE) baseband control unit component (BBCU), user-plane function component (UPFC), and fiber path selection component (FPSC), in accordance with aspects of the subject disclosure. System 200 can comprise CPC 210 that can configure a wireless frontend of a CPE, e.g., to provide a cellular link to a UE, etc., and/or can configure a backend of a CPE, e.g., configuring one or more fibers to provide steering of a data packet comprised in traffic 202, etc. CPC 210 can receive traffic 202 to be forwarded as traffic 203. Moreover, traffic 202 can be forwarded to NMC 220 to be again forwarded as traffic 204, to carrier network component 230 to be again forwarded as traffic 206, to internet component 240 to again be forwarded as traffic 208, etc.

In embodiments, CPC 210 can receive information from NMC 220 related to configuration of a CPE frontend and/or backend link. Similarly, CPC 210 can receive information from carrier network component 230 to facilitate configuring a CPE front/backend. Additionally, information can be received via internet component 240 that can enable configuration of a CPE front end and/or backend. As an example, CPC 210 can receive initial configuration information from NMC 220 indicating one or more preferred front end cellular radio frequencies, enabling CPC 210 to select a frequency that can be less likely to experience interference from other nearby CPEs, carrier macro-cells, etc. In this example, CPC 210 can receive information from carrier network component 230 that can enable configuring the example CPE to be operable with carrier network resources, e.g., enabling a UE to attach to the CPE based on carrier settings, forwarding of data to a user-plane function (UPF), access and mobility management function (AMF), session management function (SMF), etc., or other configurations that support and facilitate an interface between core network functions, gateways, access points, devices, etc. Further in this example, internet component 240 can communicate information to CPC 210 that can indicate network conditions that can be employed in configuring routing of portions of traffic 202, for example to avoid congestion, outages, fees, etc. Whereas CPC 210 can support multiple UEs attached to one or more access points (APs) located at the customer premises, management of the various APs, spectrum management, providing a customer premises UPF gateway, and automating configuration of fiber routing of traffic can be considered valuable features of the presently disclosed subject matter. Additionally, an NMC can enable configurations of CPEs via CPC 210 that are based on a cohesive functionality of a group of CPCs that can be located across premises of different customers, that are affiliated with different carrier networks, etc.

CPC 210 can comprise baseband control unit (BBCU) 250 that can be embodied as an integrated VNF. BBCU 250 can manage a cellular AP(s), e.g., a 5G AP, etc., located at a customer premises. In embodiments, CPC 210 can be compatible with off the shelf APs, e.g., CPC 210, BBCU 250, etc., can be compatible with 3GPP mobile broadband standards used by manufacturers of APs. In some embodiments CPC 210 can comprise one or more cellular radios and act as an AP(s). In some embodiments, CPC 210 can be connected to an external AP(s) at the customer premises, e.g., via a wired or wireless connection between an AP and CPC 210. BBCU 250 can be configured to manage the process of a UE attaching to an AP(s), e.g., CPE gNB, etc. BBCU 250 can manage spectrum configuration at a customer premises. As an example, a carrier can dictate permitted use of frequencies owned by the carrier, which configuration information can be received from NMC 220, carrier network component 230, etc. BBCU 250 an communicate with the NMC 220 and subsequently instruct an AP regarding which frequencies are allowed to be used. BBCU 250 can further refine this frontend configuration by selecting preferred frequencies from among the permitted frequencies, e.g., selecting a better performing frequency over a lesser performing frequency from among the permitted frequencies. BBCU 250 can further be configured to forward traffic 202 to UPF component (UPFC) 260 as described elsewhere herein. Moreover, BBCU 250 can forward traffic 202 to AMF/SMF functions residing in a carrier network core, e.g., via carrier network component 230, etc. As such, BBCU 250 can facilitate an interface between core function gateways, access points, and UEs. Configuration of CPC 210 can follow 3GPP standards and can therefore be generally operable with other off the shelf wireless broadband products, e.g., APs, etc. BBCU 250 can be closely integrated with UPFC 260, e.g., close integration between UPF and BBCU functions. In some embodiments, UPFC 260 can be so closely integrated as to make BBCU 250 appear to be almost an extension of UPF functions.

UPFC 260 can enable transmission and control of data from the BBCU to external networks, e.g., internet component 240, core management functions via carrier network component 230, etc. UPFC 260 can further manage network alarms, which can be, for example, communicated to NMC 220 functions. Embodiments of UPFC 260 can be comprised of integrated VNFs, again that typically comply with 3GPP standards. As previously disclosed, UPFC 260 can be closely interfaced with BBCU 250. UPFC 260 can be regarded as a CPE gateway tightly coupled to BBCU 250.

CPC 210 can further comprise fiber path selection component (FPSC) 270 that can be closely integrated with BBCU 250 and UPFC 260. FPSC 270 can determine how the data packets comprising traffic 202 should be routed. In examples, portions of traffic 202 can be routed around problem portions of external networks, can be routed to a carrier network that can access to premium services, etc. In an example, portions of traffic 202 can be routed to NMC 220 for further routing. FPSC 270 can move routing functionality away from typical fiber datacenters and into a CPE. This can provide greater control over routing of data packets. Moreover, this can move data packet routing decisions out to customer premises, which can allow light and nimble configuration of data packet routing. As an example, routing can be made highly granular at a CPE corresponding to CPC 210 without burdening routing functions at a fiber datacenter. As such, where a fiber datacenter may limit granularity of routing due to the impact on their systems, highly granular routing rules as a CPC 210 via FPSC 270 can be performed, typically without concern for the fiber datacenter limits. Embodiments of FPSC 270 can correspond to multiple separate interfaces, e.g., fiber connections, and/or cable connections, to enable configurable routing of portions of traffic 202. Embodiments of FPSC 270 can route portions of traffic 202 through a single interface, for example, using normal internet protocol (IP) routing, through a gateway function of NMC 220, etc.

Figure 3:
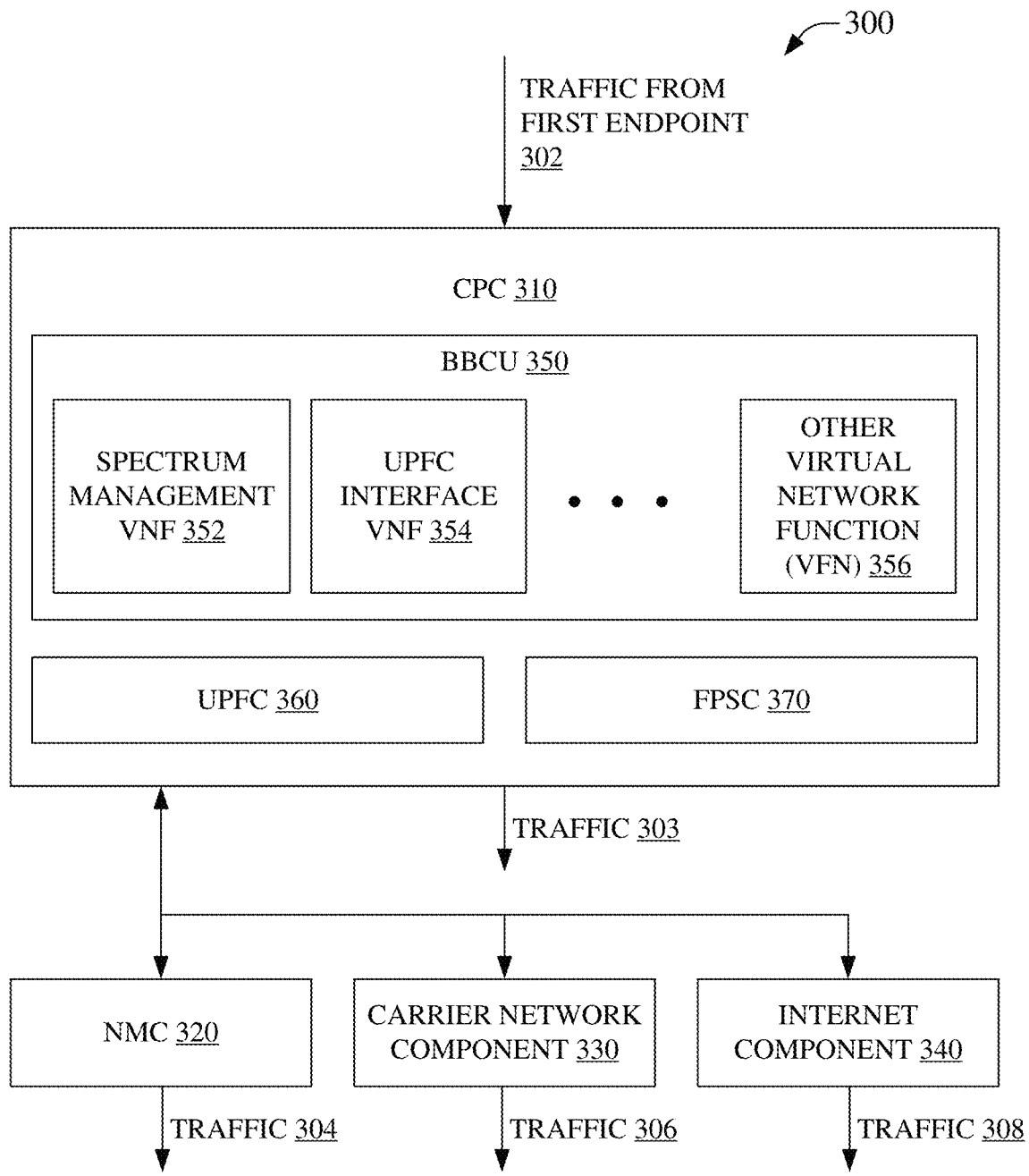
FIG. 3 is an illustration of an example system that can enable configuration of a customer premises equipment (CPE) baseband control unit component (BBCU), via instantiating a BBCU virtual network function (VNF), in accordance with aspects of the subject disclosure.

FIG. 3 is an illustration of a system 300, which can facilitate configuration of a customer premises equipment (CPE) baseband control unit component (BBCU), via instantiating a BBCU virtual network function (VNF), in accordance with aspects of the subject disclosure. System 300 can comprise CPC 310 that can configure a wireless frontend of a CPE, e.g., to provide a cellular link to a UE, etc., such as through one or more internal and/or external cellular APs. CPC 310 can alco configure a backend of a CPE, e.g., configuring one or more fibers to provide steering of a data packet comprised in traffic 302, etc. As noted elsewhere herein, CPC 310 can be, or can be comprised in, a CPE. CPC 310 can receive traffic 302 to be forwarded as traffic 303. Moreover, traffic 302 can be forwarded, in accordance with data packet steering/routing supported by the configuration of the backend, to NMC 320 to be again forwarded as traffic 304, to carrier network component 330 to be again forwarded as traffic 306, to internet component 340 to again be forwarded as traffic 308, etc. In embodiments, CPC 310 can receive information from one or more of NMC 320, carrier network component 330, internet component 340, or combinations thereof, related to configuration of a CPE frontend and/or backend connection. In embodiments, CPC 310 can receive information from one or more of NMC 320, carrier network component 330, internet component 340, or combinations thereof, related to configuration of a CPE frontend and/or backend connection. CPC 310 can support a UE(s) attached to an AP(s) located at the customer premises. NMC 320 can further enable configuration of multiple CPEs, including CPC 310, based on parameters for a group(s) of CPCs, for example, coordinating allowable frequencies between proximate CPE coverage areas to reduce interference, improve performance, etc.

In embodiments, CPC 310 can comprise BBCU 350, UPFC 360, and FPSC 370. As such, CPC 310 can enable management of AP(s) functionality, spectrum management, providing a customer premises UPF gateway(s), and automating configuration of fiber routing of traffic, at a customer premises, thereby reducing the same at carrier network core components, carrier network RAN components, etc. BBCU 350 can, as noted elsewhere herein, be implemented as a VNF(s). In this regard, BBCU 350 can comprise one or more VNFs, such as spectrum management VNF 352, UPFC interface VNF 354, other VNF 356, etc. In an embodiment, spectrum management VNF 352 can facilitate configuration of frontend frequencies, e.g., at CPC 310, at a CPE corresponding to CPC 310, at a customer premises AP(s) supported by CPC 310, etc. Spectrum management VNF 352 can receive information corresponding to spectrum usage, performance, etc., and can configure preferred frontend frequencies providing a link between a UE(s) and an AP supported by CPC 310. As an example, a customer premises can have a first and second cellular AP on-site that can be supported by CPC 310. In this example, where the first AP uses a first frequency and the second AP uses a second frequency, it can be determined, for example by spectrum management VNF 352, that the use of first and second frequencies is resulting in interference, such as where coverage areas of the first and second AP overlap and the first and second frequencies are interfering frequencies. Accordingly, spectrum management VNF 352 in this example, can configure the first and second APs to use other frequencies that have lower interference despite the proximity of the first AP to the second AP. Alternatively in this example, transmit power of the first and second AP can be adjusted by spectrum management VNF 352 to alter corresponding coverage areas to reduce interference associated with the overlap of the coverage areas employing the first and second frequencies. In embodiments, CPC 310 can receive information from NMC 320 that can indicate a first AP of a first customer premises is interfering with a second AP of a second customer premises, e.g., a neighboring customer premises, and can reconfigure the first AP to reduce interference.

UPFC interface VNF 354 of BBCU 350 can facilitate integration with UPFC 360 of CPC 310. UPFC interface VNF 354 can configure forwarding of portions of traffic 302 to UPFC 360. Additional VNF(s) of BBCU 350, e.g., other VNF 356, etc., can support configuration of BBCU 350 of CPC 310 to, for example, support forwarding of portions of traffic 302 to AMF/SMF functions of a carrier network core, e.g., via carrier network component 330, can configure UE attachment to an AP(s) supported by CPC 310, etc. UPFC interface VNF 354 can follow 3GPP standards. UPFC interface VNF 354 can be generally interoperable with third-party devices, e.g., APs manufactured by other entities, etc.

Figure 4:
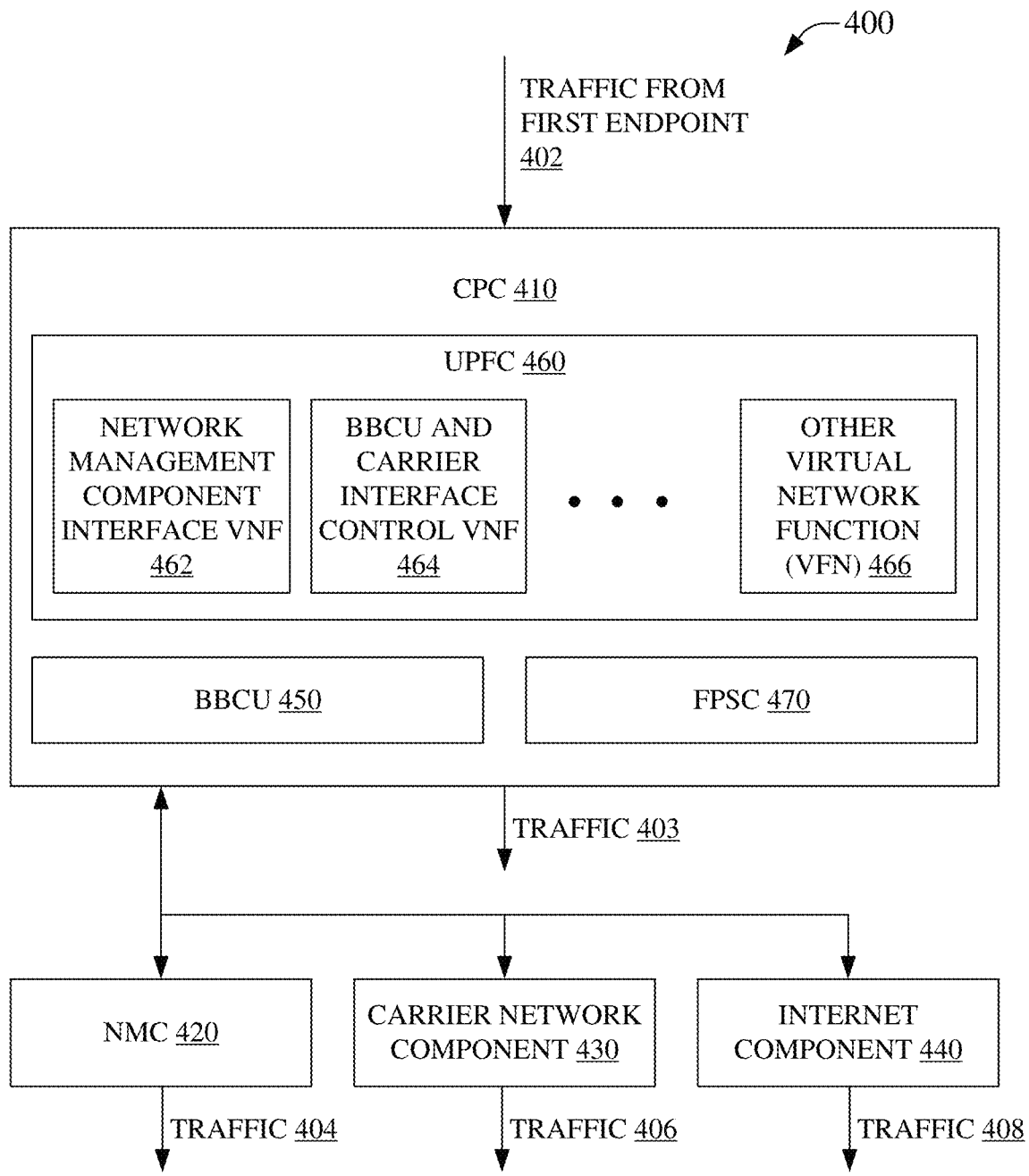
FIG. 4 illustrates an example system that can facilitate configuration of a customer premises equipment (CPE) user-plane function component (UPFC), via instantiating a UPFC virtual network function (VNF), in accordance with aspects of the subject disclosure.

FIG. 4 is an illustration of a system 400, which can enable configuration of a customer premises equipment (CPE) user-plane function component (UPFC), via instantiating a UPFC virtual network function (VNF), in accordance with aspects of the subject disclosure. System 400 can comprise CPC 410 that can configure a wireless frontend of a CPE, e.g., to provide a cellular link to a UE, etc., such as through one or more internal and/or external cellular APs. CPC 410 can alco configure a backend of a CPE, e.g., configuring one or more fibers to provide steering of a data packet comprised in traffic 402, etc. As noted elsewhere herein, CPC 410 can be, or can be comprised in, a CPE. CPC 410 can receive traffic 402 via a configured frontend to be forwarded as traffic 403 via a configured backend. Moreover, traffic 402 can be forwarded, in accordance with data packet steering/ routing supported by the configuration of the backend, to NMC 420 to be again forwarded as traffic 404, to carrier network component 430 to be again forwarded as traffic 406, to internet component 440 to again be forwarded as traffic 408, etc. In embodiments, CPC 410 can receive information from one or more of NMC 420, carrier network component 430, internet component 440, or combinations thereof, related to configuration of a CPE frontend and/or backend connection. CPC 410 can support a UE(s) attached to an AP(s) located at the customer premises. NMC 420 can further enable configuration of multiple CPEs, including CPC 410, based on conditions for a group(s) of CPCs.

In embodiments, CPC 410 can comprise BBCU 450, UPFC 460, and FPSC 470. As such, CPC 410 can enable management of AP(s) functionality, spectrum management, providing a customer premises UPF gateway(s), and automating configuration of fiber routing of traffic, at a customer premises, thereby reducing management of these aspects at carrier network core components, carrier network RAN components, etc. UPFC 460 can, as noted elsewhere herein, be implemented as a VNF(s). In this regard, UPFC 460 can comprise one or more VNFs, such as NMC interface VNF 462, BBCU and carrier interface control VNF 464, other VNF 466, etc. In an embodiment, NMC interface VNF 462 can facilitate configuring communication with an NMC, such as with NMC 420 or with other NMCs such as NMC 622, 624, etc. As examples, NMC interface VNF 462 can configure CPC 410 to send network alerts, etc., to NMC 420, can receive information from NMC 420 corresponding to CPC 410 configuring spectrum usage at an AP(s), etc.

In embodiments, UPFC 460, via BBCU and carrier interface control VNF 464, can support interaction with BBCU 450. As an example, BBCU and carrier interface control VNF 464 can interact with a UPFC interface VNF, such as UPFC interface VNF 354 of system 300, etc., to support close integration of UPFC 460 and BBCU 450, etc. In embodiments, BBCU and carrier interface control VNF 464 can support communication between BBCU 450 and NMC 420, etc., for example to facilitate configuration of CPC 410 in regard to spectrum management features, as disclosed elsewhere herein. Similarly, BBCU and carrier interface control VNF 464 can support communication between BBCU 450 and carrier network component 430, etc., for example, to facilitate configuring forwarding of portions of traffic 402 to an AMP/SMF function(s) residing in a carrier network core component via carrier network component 430. Generally, the VNFs of UPFC 460 can be regarded as configuring a user-plane of CPC 410, e.g., an AP/CPE supported by or comprised in CPC 410, etc., to enable BBCU 450 to effect communication of portions of traffic 402 appropriately, e.g., to receive traffic 402 from a UE(s) via an AP(s), to send portions of traffic 402 to NMC 420, a carrier function via carrier network component 430, to another endpoint device via Internet component 440, etc., or combinations thereof, wherein the configuration of the user-plane can support steering of packets, e.g., via automated configuration/adaptation of packet routing, as described elsewhere herein.

Figure 5:
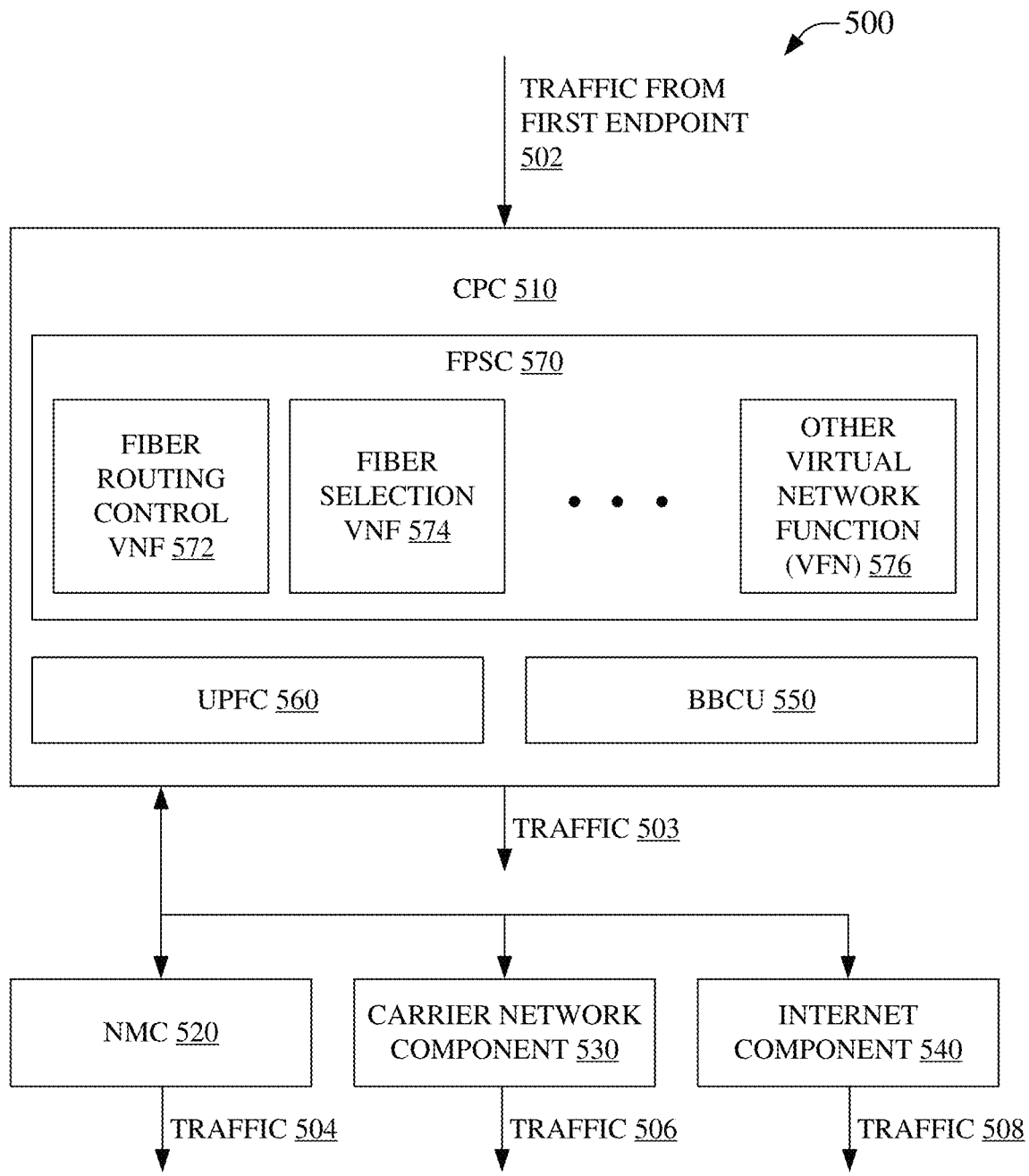
FIG. 5 illustrates an example system that can facilitate configuration of a customer premises equipment (CPE) fiber path selection component (FPSC), via instantiating a FPSC virtual network function (VNF), in accordance with aspects of the subject disclosure.

FIG. 5 is an illustration of a system 500, which can support configuration of a customer premises equipment (CPE) fiber path selection component (FPSC), via instantiating a FPSC virtual network function (VNF), in accordance with aspects of the subject disclosure. System 500 can comprise CPC 510 that can configure a wireless frontend of a CPE, e.g., to provide a cellular link to a UE, etc., such as through one or more internal and/or external cellular APs. CPC 510 can also configure a backend of a CPE, e.g., configuring one or more fibers to provide steering of a data packet comprised in traffic 502, etc. As noted elsewhere herein, CPC 510 can be, or can be comprised in, a CPE. CPC 510 can receive traffic 502 via a configured frontend to be forwarded as traffic 503 via a configured backend. Moreover, traffic 502 can be forwarded, in accordance with data packet steering/routing supported by the configuration of the backend, to NMC 520 to be again forwarded as traffic 504, to carrier network component 530 to be again forwarded as traffic 506, to internet component 540 to again be forwarded as traffic 508, etc. In embodiments, CPC 510 can receive information from one or more of NMC 520, carrier network component 530, internet component 540, or combinations thereof, related to configuration of a CPE frontend and/or backend connection. CPC 510 can support a UE(s) attached to an AP(s) located at the customer premises. NMC 520 can further enable configuration of multiple CPEs, including CPC 510, based on conditions for a group(s) of CPCs.

In embodiments, CPC 510 can comprise BBCU 550, UPFC 560, and FPSC 570. As such, CPC 510 can enable management of AP(s) functionality, spectrum management, providing a customer premises UPF gateway(s), and automating configuration of fiber routing of traffic, at a customer premises, thereby reducing management of these aspects at carrier network core components, carrier network RAN components, etc. FPSC 570 can be implemented as a VNF(s). In this regard, FPSC 570 can comprise one or more VNFs, such as fiber routing control VNF 572, fiber selection VNF 574, other VNF 576, etc. In an embodiment, fiber routing control VNF 572 can facilitate configuring backend communication with an NMC, such as with NMC 520 or with other NMCs such as NMC 622, 624, etc., with carrier network component 530, with internet component 540, etc. As an example, fiber routing control VNF 572 can configure CPC 510 to send a portion of traffic 502, such as voice over IP (VoIP) packets, to carrier network component 530 and another portion of traffic 502, such as website traffic packets, to internet component 540. In embodiments, fiber routing control VNF 572 can configure CPC 510 to route a data packet by wrapping the data packet with updated routing information, altering the data packet header to update routing, causing a UE to use updated routing information when generating the data packet, etc. Fiber routing control VNF 572 can be employed to steer data packets on one or more fiber connections. As an example, with a single fiber connection, a data packet header can be updated to cause steering of the packet upon arrival at a fiber datacenter, which can move routing control away from the fiber datacenter and to the CPC 510.

In embodiments, fiber selection VNF 574 can support routing control by selecting a fiber from a group of fibers connected to CPC 510 or a CPE supported by CPC 510. In this regard, a customer premises can have access to multiple fibers that, for example, can be provided by different infrastructure entities, e.g., a utility company can provide a first fiber to a first fiber datacenter, a network operator can provide a second fiber to a network operator fiber datacenter, a municipality can provide a third fiber to a municipal fiber datacenter, etc. Accordingly, fiber selection VNF 574 can support steering of portions of traffic 502 via selection of fiber(s) from a group of available fiber(s). As an example, low priority portions of traffic 502 can be steered to a fiber connected to a municipal fiber datacenter, while high priority portions of traffic 502 can be steered to another fiber connected to a carrier network core, such as where the example carrier core can offer better performance but at a higher cost than moving data via the example municipal fiber. Other VNF 576, for example, can be a failover VNF that can reroute portions of traffic 502 to a second fiber where a first fiber performance becomes unsatisfactory, to a wireless backend interface to a RAN where a fiber transmission fails, etc.

Figure 6:
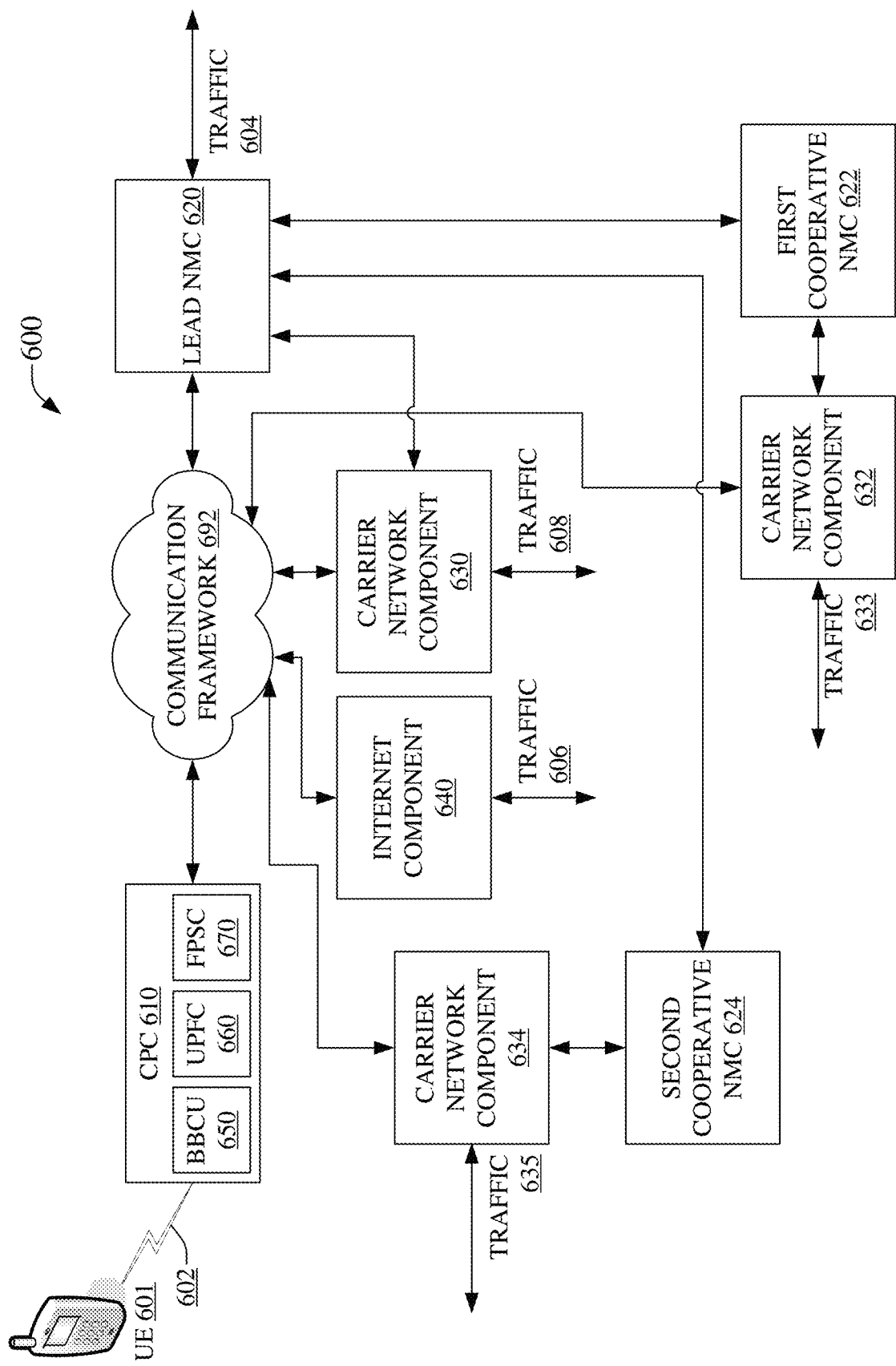
FIG. 6 is an illustration of an example system enabling configuration of customer premises equipment (CPE) in communication with a network management component (NMC) located remotely from the CPE, in accordance with aspects of the subject disclosure.

FIG. 6 is an illustration of a system 600, which can facilitate configuration of customer premises equipment (CPE) in communication with a network management component (NMC) located remotely from the CPE, in accordance with aspects of the subject disclosure. System 600 can comprise CPC 610 that can configure a frontend connection between one or more UEs, e.g., UE 601, etc., and another endpoint via configuration of a backend connection via communication framework 692. CPC 610 can configure a frontend cellular connection via one or more cellular AP of a customer premises that can comply with 3GPP standards. Moreover, CPC 610 can configure a backend connection that can automatically route data packets via connection modalities that can comprise one or more fiber connections to communication framework 692.

CPC 610 can comprise BBCU 650, UPFC 660, and FPSC 670. As such, CPC 610 can enable management of AP(s) functionality, spectrum management, providing a customer premises UPF gateway(s), and automating configuration of fiber routing of traffic, at a customer premises, thereby reducing management of these aspects at carrier network core components, carrier network RAN components, etc. A frontend 3GPP compliant cellular connection configured via CPC 610 can transport traffic 602 between a UE(s) and communication framework 692 via CPE(s), e.g., CPC 610 can itself be a CPE, can be comprised in a CPE, and/or can support an external CPE, wherein a CPE can comprise a mobile broadband/cellular AP(s) of the customer premises and/or can support an external a mobile broadband/cellular AP(s) of the customer premises, etc. BBCU 650 can configure support UE attachment, spectrum management, access to AMF/SMF function(s) of a carrier network core, etc., as disclosed elsewhere herein. UPFC 660 can configure user-plane function(s) at the customer premises and can be tightly integrated with BBCU 650 to support communication of traffic 602 to other components via communication framework 692, for example, transmission and control of traffic 602 via BBCU 650 to external networks, e.g., internet component 640, carrier network component 630 including to core management function(s) in a carrier network, to lead NMC 620, first cooperative NMC 622, second cooperative NMC 624, etc.

CPC 610 can be connected to external components communication framework 692, of which a portion can comprise one or more fibers connecting a CPE backend to an external component, such as, carrier network component 630, 632, 634, etc., lead NMC 620, internet component 640, etc. Internet component 640, for example, can be a fiber datacenter providing access to other servers via wide area networks (WANs) such as the internet, e.g., traffic 602 can be directed by CPC 610 to internet component 640 to be forwarded on as traffic 606. Carrier network component 630 can enable access to carrier core network functions and can forward traffic 602 received from CPC 610 to other devices as traffic 608. Lead NMC 620 can receive, via CPC 610, and forward traffic 602 as traffic 604.

Lead NMC 620 can support a group(s) of CPCs, including CPC 610. Lead NMC 620 can provide CPC 610 with information about network conditions, such as outages, lowered performance, expected network maintenance, new 3GPP transport standards, etc., about spectrum use, such as spectral usage proximate to CPC 610, changes in spectrum ownership, etc., about provisioning parameters, such as can be provided by a carrier network operator via carrier network component 630, etc., or many other types of information germane to CPC 610 configuration of a front/backend for CPE/APs at a customer premises. As an example, carrier network component 630 can correspond to a first carrier and carrier network component 632 can correspond to a second carrier that can each support CPEs using unlicensed spectrum in deployments in a first geographical area. Accordingly, in this example, the CPEs can experience interference where the use of the unlicensed spectrum in unmanaged. The first example carrier and second example carrier can communicate frequencies in use for their corresponding CPEs to lead NMC 620, e.g., first carrier can report via carrier network cop 630 and second carrier can report via carrier network component 632 and first cooperative NMC 622. Continuing the example, lead NMC 620 can provide CPC 610 with frequencies in the unlicensed spectrum that can have lower interference levels, e.g., unused frequencies, frequencies in use but not proximate to CPC 610, etc. CPC 610, accordingly, can select a frequency, typically a best performing frequency, from the frequencies indicated by lead NMC 620 as having a reduced likelihood of interference. In embodiments, lead NMC 620 can act as a top-level NMC that can coordinate information received from other cooperative NMCs, e.g., first cooperative NMC 622, second cooperative NMC 624, etc. Moreover, lead NMC 620 can share information with other NMCs, e.g., first cooperative NMC 622, second cooperative NMC 624, etc., such that management of CPEs corresponding to the other NMCs can be facilitated. In some embodiments, lead NMC 620 can be a regional lead NMC where other regions can be supported by other lead NMCs, as an example, there can be both an East coast lead NMC and a West coast lead NMC that can each collect and/or share data with regional cooperative NMCs respectively.

In embodiments, CPC 610, e.g., via FPSC 670, etc., can configure a steerable fiber backend connection(s). As an example, portions of traffic 602 can be steered to internet component 640, carrier network component 630, lead NMC 620, etc., based on a configuration(s), steering rule(s), etc., determined via FPSC 670. In some embodiments, such as where a data packet header is update based on the configured packet steering, a data packet can be communicated via a fiber and be routed according to the updated header by a component at the far end of the fiber, e.g., a fiber datacenter, etc. This can support moving fiber routing control away from fiber datacenters and towards CPEs, which can give a customer greater control over routing of their data, customer selectable routing granularity, etc. In multifiber configurations, a customer can also be endowed with an ability to select with fiber operating entity to use for different portions of traffic 602. As an example, a first fiber can be provided between CPC 610 and carrier network component 630 corresponding to service from a first carrier entity, a second fiber between CPC 610 and carrier network component 632 corresponding to service from a second carrier entity, and a third fiber between CPC 610 and carrier network component 634 corresponding to service from a third carrier entity. In this example, CPC 610 can route a portion of traffic 602 on any of the three available fibers. However, where monetary cost is based on an amount of data transported by each carrier, it can be appreciated that steering data to a lower cost carrier's fiber can be desirable. Moreover, in this example, the third carrier can provide premium data transport services, intended for near real-time communication such as multiplayer gaming, stock and commodity marker pricing, etc., at a higher monetary cost. As such, some portions of traffic 602 can be steered to this third fiber to take advantage of the premium data transport capabilities where it is determined that the increased cost is acceptable. This can illustrate that a cost-benefit analysis for fiber selection can be performed at CPC 610, e.g., via FPSC 670, without sharing sensitive cost threshold information with any of the three example carriers, as could be needed where routing is instead performed by any of the example carriers. As such, in embodiments, portions of traffic 602 steered to carrier network component 634 can be forwarded as traffic 635, and similarly, portions of traffic 602 steered to carrier network component 632 can be forwarded as traffic 633. In some embodiments, such as a single fiber traversing a fiber datacenter, e.g., of carrier network component 630, of internet component 640, etc., portions of traffic 602 can be steered at a remote device, for example at a remote terminus of the example single fiber. As an example, portions of traffic 602 can be routed via a single fiber to internet component 640, e.g., a fiber datacenter, and can be forwarded as traffic 606, however, traffic 606 can be steered to carrier network component 634, for example, based on the configured packet steering at CPC 610, e.g., the packet can be encapsulated with routing information to achieve preferred routing that includes traversing internet component 640 in this example. Similarly, in example embodiments, traffic 608 can be steered to another selectable component based on configurations performed by FPSC 670.

Figure 7:
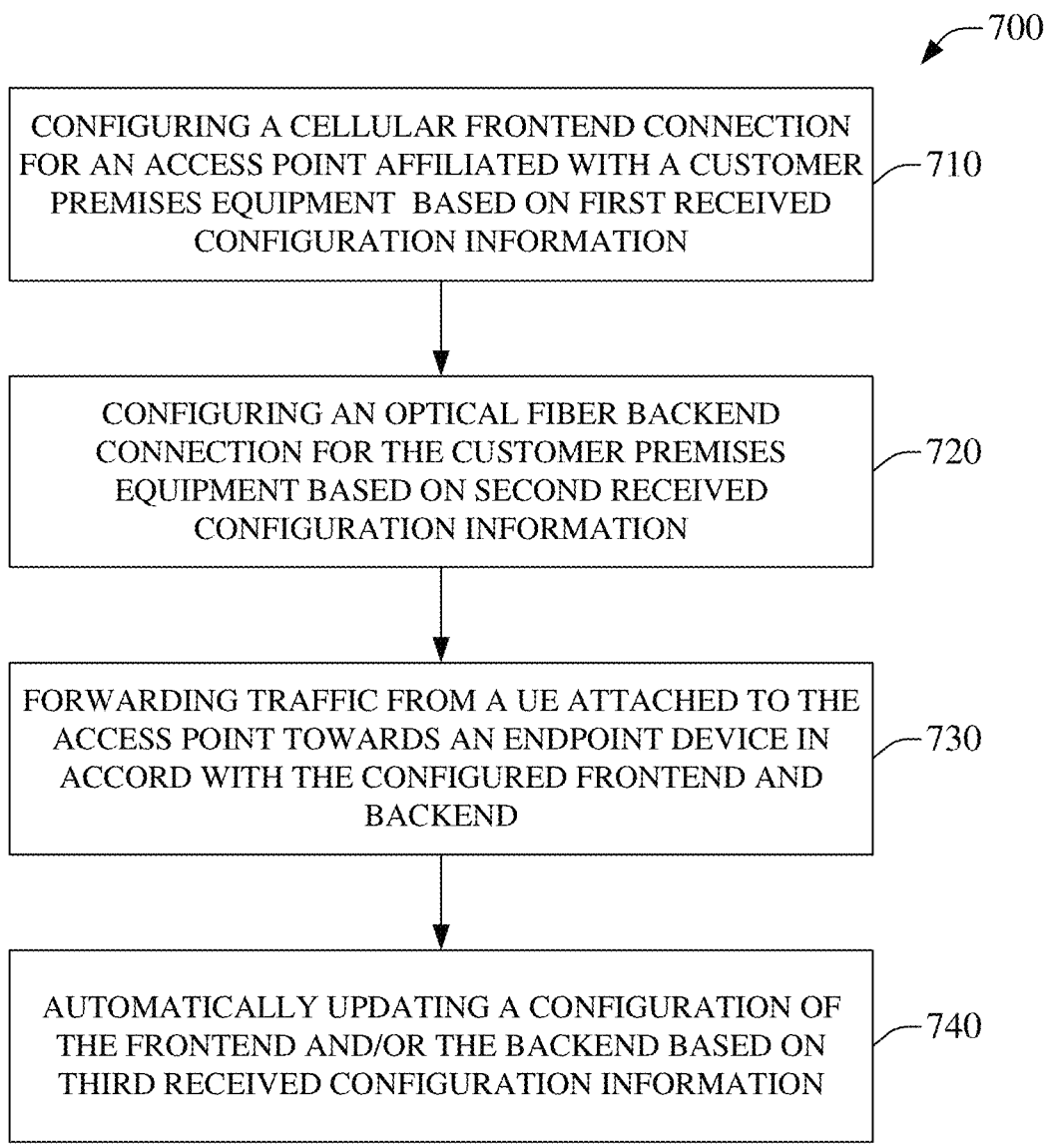
FIG. 7 illustrates an example method, facilitating configuration of customer premises equipment (CPE), in accordance with aspects of the subject disclosure.
Figure 8:
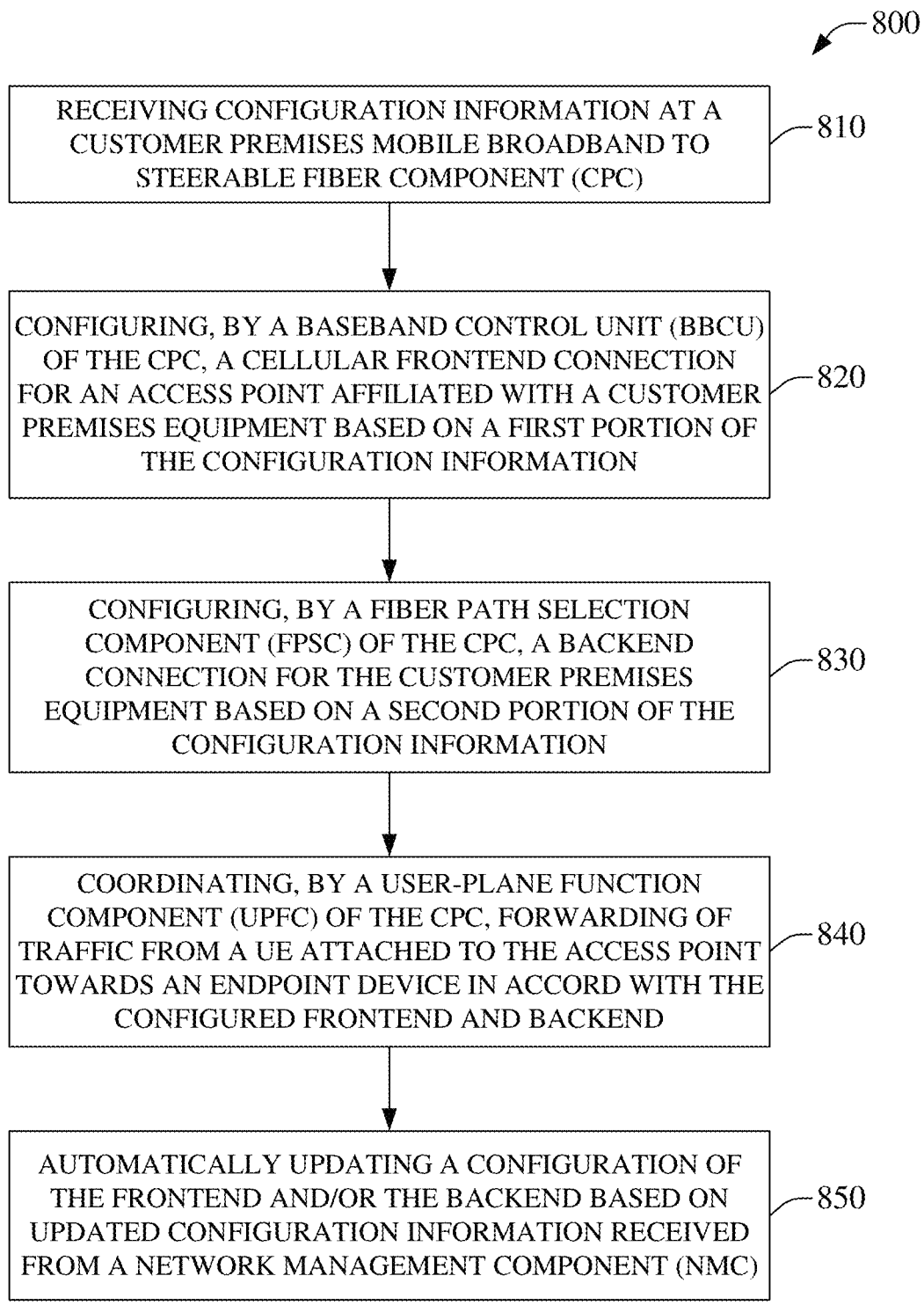
FIG. 8 illustrates an example method, enabling configuration of customer premises equipment (CPE) via a remotely located network management component (NMC), in accordance with aspects of the subject disclosure.

In view of the example system(s) described above, example method(s) that can be implemented in accordance with the disclosed subject matter can be better appreciated with reference to flowcharts in FIG. 7-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 7 illustrates example method 700 that facilitates configuration of customer premises equipment (CPE), in accordance with aspects of the subject disclosure. Method 700, at 710, can comprise configuring a cellular frontend connection for an access point affiliated with a customer premises equipment based on first received configuration information. In embodiments, configuration information, including the first and/or second received configuration information, can be received from a network management component (NMC), a carrier network component, an internet component, etc. As an example, a lead NMC can maintain updated provisioning information for a carrier network, which can be sent to a customer premises mobile broadband to steerable fiber component (CPC), which can be a CPE, be comprised in a CPE, be connected to a CPE, etc. In this example, the CPC can use received updated provisioning information from the NMC to configure a CPE frontend, e.g., cellular APs affiliated with the CPC, such as via a CPE, etc., to enable a UE(s) to access a carrier network function(s), such as attaching to the carrier network via a CPE affiliated AP(s), accessing the AMF/SMF functions of a carrier network core via a CPE affiliated AP(s), etc. In another example, spectral landscape information can be received at a CPC from an NMC, which can enable the CPC to configure a CPE frontend to use frequencies that can have better performance, higher speed/bandwidth, lower interference, etc., that other frequencies. In this example, some frequencies may be in use by neighboring cellular APs, and it can be desirable for an AP of the CPC to use different frequencies to avoid interference with other proximate frequencies in use by the neighboring cellular APs.

At 720, method 700 can comprise configuring an optical fiber backend connection for the customer premises equipment based on second received configuration information. In embodiments, CPC can configure a steerable fiber backend based on received configuration information. A steerable fiber backend can selectively and automatically route data packets, e.g., portions of traffic from a UE attached to a CPE/CPC. Fiber steering can be based on a configurable rule(s). As an example, a rule can be configured by CPC to route priority data packets via a first fiber to a carrier core network gateway and route non-priority data packets to an internet gateway. In another example, a rule can be configured by CPC to automatically failover from an underperforming fiber to a wireless connection to a RAN, while a corresponding rule can revert to the fiber where it is determined that the underperforming condition has been resolved. In a further example, CPC can configure a rule(s) to select fiber connections to different fiber providers based on performance, monetary cost, contractual agreements, or nearly any other parameter. In embodiments, steering of data packets can comprise updating a packet header to modify routing of the packet, wrapping the data packet to provide alternate routing, causing data packets to be generated with updated routing information, etc. As such, a data packet can comprise an updated routing information, according to the configuration by CPC, that can further enable steering with just a single fiber connection by causing a first external node in the communication path to route the data packet according to the updated routing information rather than pre-updated routing information for the data packet. Configuration of the steerable fiber backend of a CPE/CPC can functionally move control of fiber routing to a customer premises and away from control by an external fiber datacenter.

Method 700, at 730, can comprise forwarding traffic from a UE attached to the access point towards an endpoint device in accord with the configured frontend and backend. Generally, it is envisioned that when a CPE/CPC is first configured, the CPE/CPC can establish a session with an NMC to perform initial provisioning and establish security credentials. This can enable the CPC to connect to a carrier network core and receive further configuration information, such as to enable configuration of a user-plane function(s) of the CPC. This can enable a UE attached to an AP affiliated with a CPE/CPC, to access a core network function(s). Further, the configured CPC can enable UE traffic to be steered to other endpoint devices, e.g., according to a routing rule(s) for the backend, and via a cellular link at the frontend.

At 740, method 700 can comprise automatically updating a configuration of the frontend and/or the backend based on third received configuration information. At this point, method 700 can end. A CPC can update configuration(s) of a frontend, backend, etc., such as in response to receiving updated information related to the configuration, e.g., a change in network performance, a change in a contractual agreement, a change in monetary cost to use a network resource, a change in a spectral landscape, etc. As an example, a topology of a proximate carrier RAN network can change to use a frequency already configured for frontend use by the CPC. Accordingly, in this example, the change in the spectral landscape can be communicated to the CPC and the CPC can respond by altering the frontend configuration to use a different frequency. In another example, a CPC can be connected by different fibers to a first and second fiber datacenters. In this example, where the CPC is informed that the first fiber datacenter is heavily used, CPC can update a backend configuration to shift traffic to the less heavily used second fiber datacenter, e.g., shifting some traffic from a first fiber to a second fiber.

FIG. 8 illustrates example method 800 facilitating configuration of customer premises equipment (CPE) via a remotely located network management component (NMC), in accordance with aspects of the subject disclosure. At 810, method 800 can comprise receiving configuration information at a customer premises mobile broadband to steerable fiber component (CPC). The configuration information can be received from a remotely located NMC. In embodiments, the NMC can keep up to date information related to numerous parameters relevant to CPC configuration. As an example, NMC can store carrier provisioning and security information that can be used by CPC to configure UE access to a carrier network and/or function(s) via the CPC. As a further example, the NMC can store spectral landscape information that can enable the CPC to configure a wireless mobile broadband frontend to use preferred frequencies, coordinate temporal sharing of a frequency, select a transmit power for APs of the customer premises, etc. As another example, NMC can store data related to pricing for fiber transport services, enabling CPC to configure a steerable fiber backend to select a preferred fiber route based on cost, configure/implement a rule(s) related to steering data packets via one or more connected optical fibers, etc.

Method 800, at 820, can comprise configuring, by a baseband control unit (BBCU) of the CPC, a cellular frontend connection for an access point affiliated with a customer premises equipment based on a first portion of the configuration information. In embodiments, a BBCU can be a VNF of the CPC and can manage the mobile broadband APs deployed at a customer premises, e.g., one or more 5G APs at a corporate campus and affiliated to the CPC. This can enable a CPC to interoperate with APs manufactured by nearly any company. The BBCU can support configuration of a wireless frontend and can manage device attachment to an AP, forwarding of data to a user-plane function component (UPFC) of the CPC, forwarding of data to an AMF, SMF, etc., function(s) residing in a carrier network core, etc. Generally stated, a BBCU can facilitate an interface between a core functions gateway(s), an AP, and a UE via a configured cellular frontend. In embodiments, configurations can be 3GPP standard(s) compliant. Furthermore, in embodiments where the CPC comprises a UPFC, the BBCU and UPFC can be closely integrated, whereby the BBCU can almost appear to be an extension of a user-plane function(s). Similar to other disclosed embodiments, configuration information can be received from an NMC, a carrier network component, an internet component, etc.

At 830, method 800 can comprise configuring, by a fiber path selection component (FPSC) of the CPC, a backend connection for the customer premises equipment based on a second portion of the configuration information. A steerable fiber backend can selectively and automatically route data packets, e.g., portions of traffic from a UE attached to a CPE/CPC. Fiber steering can be based on a rule(s) that can be configured by CPC. In embodiments, steering of data packets can comprise updating a packet header to modify routing of the packet, wrapping the data packet to provide alternate routing, causing data packets to be generated with updated routing information, etc. As such, a data packet can comprise updated routing information, according to the configuration by CPC, that can further enable steering with just a single fiber connection by causing a first external node in the communication path to route the data packet according to the updated routing information rather than pre-updated routing information for the data packet. Configuration of the steerable fiber backend of a CPE/CPC can functionally move control of fiber routing to a customer premises and away from control by an external fiber datacenter.

Method 800, at 840, can comprise coordinating, by a user-plane function component (UPFC) of the CPC, forwarding of traffic from a UE attached to the access point towards an endpoint device in accord with the configured frontend and backend. UPFC can support transmission and control of data from a BBCU towards external networks, e.g., an internet component, a core management function(s) via a carrier network component, etc. Additionally, UPFC can manage network alarms, for example, communicating them to an NMC. In embodiments, a UPFC can comply with 3GPP standards. As previously disclosed, a UPFC can be closely interfaced with a BBCU. In an example, a UPFC can support forwarding of portions of data traffic to an AMF/SMF function(s) of a carrier network. CPC comprising a UPFC can enable management of user-plane function access at a customer premises rather than more conventional control by equipment external to the customer premises.

Method 800, at 850, can comprise automatically updating a configuration of the frontend and/or the backend based on updated configuration information received from a network management component (NMC). At this point, method 800 can end. As disclosed elsewhere herein, an NMC of the disclosed subject matter can keep up to date information related to numerous parameters relevant to CPC configuration. In this regard, the NMC can be used as a clearinghouse to disseminate updated information relevant to configuring a CPC(s). In an example, an NMC can be a regional NMC that can provide information to many CPCs of a region. Accordingly, in this example, a carrier updating access information can provide this update to the NMC that can then notify the many CPCs that updated carrier information is available, which can enable the many CPCs to self-update, under their own control, configurations of the CPCs to permit UEs to continue accessing carrier resources. This can be contrasted with a carrier individually communicating with each CPC, where control of the updating then is with the carrier rather than with the CPE/CPC as disclosed herein. In another example, many carriers can report spectral landscape information to an NMC, which can be aggregated and analyzed to identify conflicts or conditions that can cause reduced performance, such as multiple APs using a same frequency in an overlapping area. The aggregate spectral topology can be used to inform a CPC(s) of adverse spectral conditions, alternate and/or preferred frequencies, etc. In this example, the CPC(s) can determine if a frequency configuration is to be implemented and can correspondingly update a frontend configuration. In embodiments, the update can be reported back to the NMC and can be used to update the aggregated spectral map. As such, for example, where a first CPC and a second CPC are both using a same frequency in close proximity to each other, alternate frequencies can be proposed to these same CPCs. Where the first CPC has environmental conditions that disfavor use of an alternate frequency, the NMC can be advised that the CPC will not update the corresponding configuration. This can result in the second CPC updating a configuration to use the alternate frequency where the second CPC can find such alternate frequency acceptable for use. Numerous other examples are readily appreciable and are considered within the scope of this disclosure even where not explicitly recited for the sake of clarity and brevity.

Figure 9:
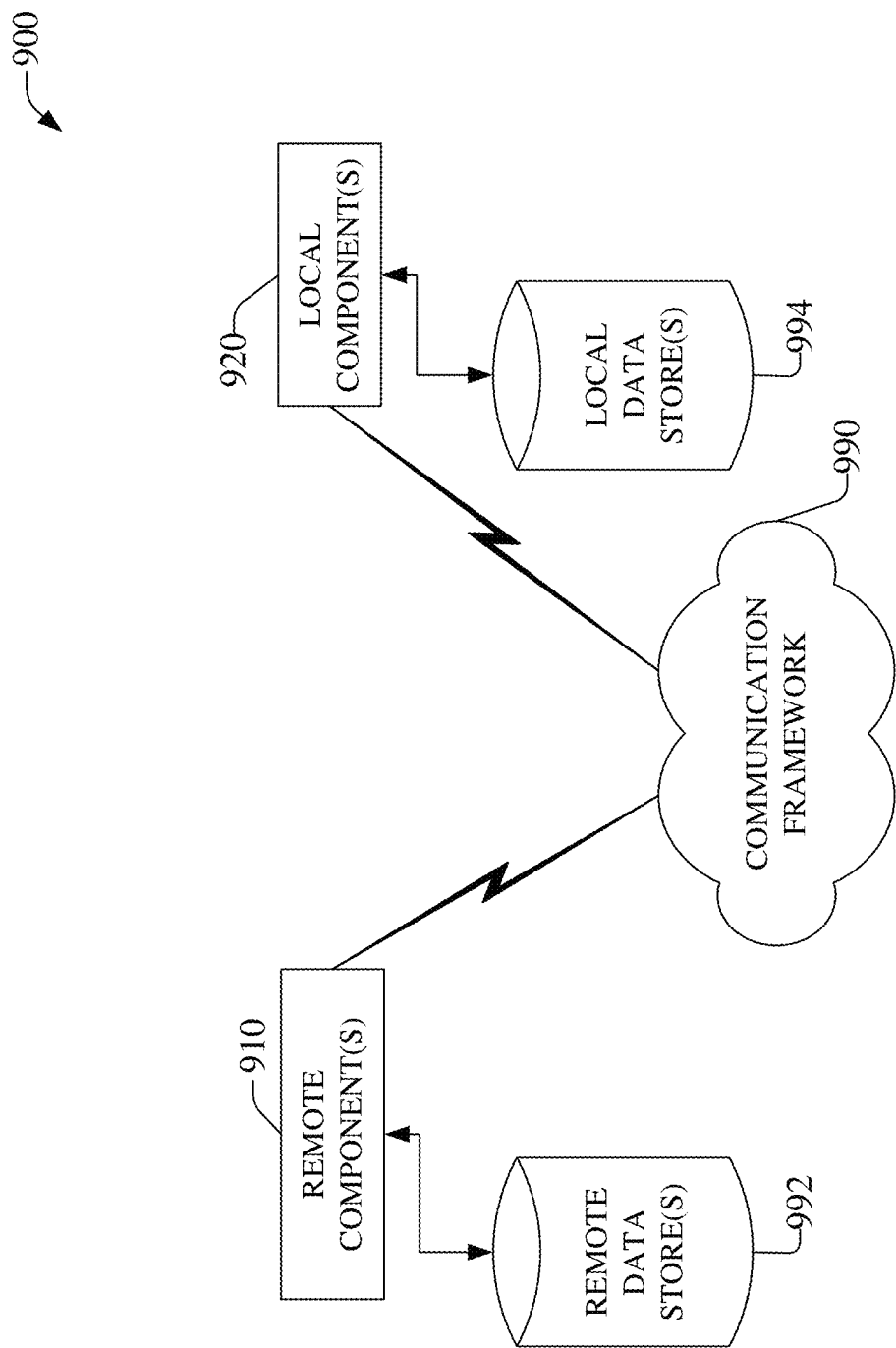
FIG. 9 depicts an example schematic block diagram of a computing environment with which the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can comprise CPC 110-610, etc., NMC 120-620, 622, 624, etc., carrier network component 130-630, 632, 634, etc., internet component 140-640, etc., UE 601, etc., or any other component that is located remotely from another component of systems 100-600, etc.

The system 900 also comprises one or more local component(s) 920. The local component(s) 920 can be hardware and/or software (e.g., threads, processes, computing devices). In some embodiments, local component(s) 920 can comprise CPC 110-610, etc., NMC 120-620, 622, 624, etc., carrier network component 130-630, 632, 634, etc., internet component 140-640, etc., UE 601, etc., or any other component that is located local to another component of systems 100-600, etc. As one of many possible examples, a CPC can be comprised in a CPE connected to one or more satellite APs at a customer premises and can communicate with a an NMC located at a first other location, a carrier network component located at a second other location, and an internet component located at a third other location to facilitate steering of a portion of traffic between the UE and another endpoint device via a communications path comprising a mobile wireless broadband link and an optical fiber connection, according to configurations implemented by the CPC, at the customer premises.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 990 that can comprise path segments, path parts, etc., that can be employed to facilitate communications between the remote component(s) 910 and the local component(s) 920, and can comprise a fiber segment, metal segment, e.g., copper segment, etc., an air interface segment, e.g., Uu interface of a UMTS network, via a long-term evolution (LTE) network, 5G, 6G, and/or another path segment. Remote component(s) 910 can be operably connected to one or more remote data store(s) 992, such as a hard drive, solid state drive, SIM card, eSIM, device memory, etc., that can be employed to store information on the remote component(s) 910 side of communication framework 990. Similarly, local component(s) 920 can be operably connected to one or more local data store(s) 994, that can be employed to store information on the local component(s) 920 side of communication framework 990. As examples, traffic 102-602, information related to configuring a cellular frontend, in formation related to configuring a steerable fiber backend, etc., can be communicated between components of systems 100-600 via a communication framework, e.g., communication framework 692, 990, etc.

Figure 10:
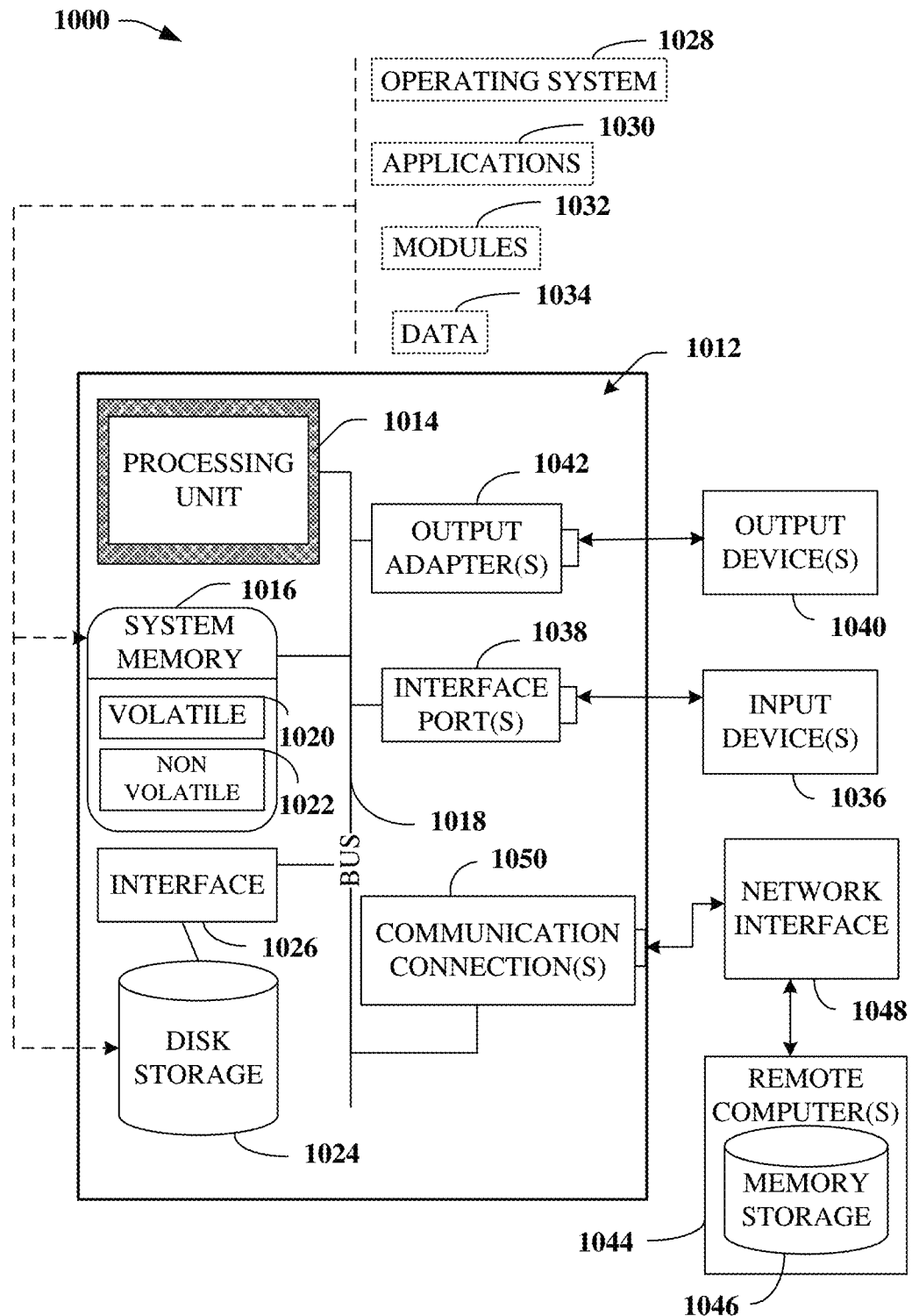
FIG. 10 illustrates an example block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), nonvolatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random-access memory, dynamic random-access memory, synchronous dynamic random-access memory, double data rate synchronous dynamic random-access memory, enhanced synchronous dynamic random-access memory, SynchLink dynamic random-access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, comprised in CPC 110-610, etc., NMC 120-620, 622, 624, etc., carrier network component 130-630, 632, 634, etc., internet component 140-640, etc., UE 601, etc., or any other component of systems 100-500, etc., can comprise a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, micro-channel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can comprise volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random-access memory, dynamic read only memory, synchronous dynamic read only memory, double data rate synchronous dynamic read only memory, enhanced synchronous dynamic read only memory, Synch-Link dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory, or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory, or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries, or other data retrieval protocols, for a variety of operations with respect to the information stored by the medium. As such, for example, a computer-readable medium can comprise executable instructions stored thereon that, in response to execution, can cause a system comprising a processor to perform operations comprising, configuring a mobile broadband frontend and configuring a fiber optic backend of the customer premises equipment based on received information relevant to configuring the customer premises equipment. The mobile broadband frontend and the fiber optic backend can enable communication between a user equipment and an endpoint device. The fiber optic backend can facilitate adaptively routing user equipment traffic via an optical fiber employed by the fiber optic backend. This can support routing a portion of traffic between the user equipment and the endpoint device via a communication path that can accord with the implemented configurations.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse/pointer input to a graphical user interface (GUI), a command line-controlled interface, etc., allowing a user to interact with computer 1012. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial busport can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud-computing environment, a workstation, a microprocessor-based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring, and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches, and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. Moreover, the use of any particular embodiment or example in the present disclosure should not be treated as exclusive of any other particular embodiment or example, unless expressly indicated as such, e.g., a first embodiment that has aspect A and a second embodiment that has aspect B does not preclude a third embodiment that has aspect A and aspect B. The use of granular examples and embodiments is intended to simplify understanding of certain features, aspects, etc., of the disclosed subject matter and is not intended to limit the disclosure to said granular instances of the disclosed subject matter or to illustrate that combinations of embodiments of the disclosed subject matter were not contemplated at the time of actual or constructive reduction to practice.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "eNodeB," "home Node B," "home access point," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can comprise packetized or frame-based flows. Data or signal information exchange can comprise technology, such as, single user (SU) multiple-input and multiple-output (MIMO) (SU MIMO) radio(s), multiple user (MU) MIMO (MU MIMO) radio(s), long-term evolution (LTE), fifth generation partnership project (5G or 5GPP); sixth generation partnership project (6G or 6GPP), next generation (NG) radio, LTE time-division duplexing (TDD), global system for mobile communications (GSM), GSM EDGE Radio Access Network (GERAN), Wi Fi, WLAN, WiMax, CDMA2000, LTE new radio-access technology (LTE-NX), massive MIMO systems, etc.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio access network. Authentication can refer to authenticating a user-identity to a user-account. Authentication can, in some embodiments, refer to determining whether a user-identity requesting a service from a telecom network is authorized to do so within the network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g., call transfer) or implicitly (e.g., call waiting). It is to be noted that service "execution" may or may not be a core network functionality as third-party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities, machine learning components, or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, extremely high frequency, terahertz broadcasts, etc.); Ethernet; X.25; powerline-type networking, e.g., Powerline audio video Ethernet, etc.; femtocell technology; Wi-Fi; worldwide interoperability for microwave access; enhanced general packet radio service; second generation partnership project (2G or 2GPP); third generation partnership project (3G or 3GPP); fourth generation partnership project (4G or 4GPP); long term evolution (LTE); fifth generation partnership project (5G or 5GPP); sixth generation partnership project (6G or 6GPP); third generation partnership project universal mobile telecommunications system; third generation partnership project 2; ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced. As an example, a millimeter wave broadcast technology can employ electromagnetic waves in the frequency spectrum from about 30 GHz to about 300 GHz. These millimeter waves can be generally situated between microwaves (from about 1 GHz to about 30 GHz) and infrared (IR) waves, and are sometimes referred to extremely high frequency (EHF). The wavelength ($\lambda$) for millimeter waves is typically in the 1-mm to 10-mm range.

The term "infer", or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices, and drawings such terms are intended to be inclusive in a manner similar to the term "comprising" as "comprising" is interpreted when employed as a transitional word in a claim.

What is claimed is:

1. A device, comprising:
   a processor; and
   a memory that stores executable instructions that, when executed by the processor, facilitate performance of operations, comprising:
      determining, for a customer premises equipment and based on first received information, a frontend configuration for a mobile broadband resource;
      determining, for the customer premises equipment and based on second received information, a backend configuration for a fiber optic resource;
      causing adaptation of a communication path between a user equipment and an endpoint device, wherein the user equipment employs the mobile broadband resource, and wherein a portion of the communication path to the endpoint device is supported by the fiber optic resource; and
      routing a portion of traffic between the user equipment and the endpoint device via the communication path according to the frontend configuration and the backend configuration,
      wherein the adaptation of the communication path is based on a path selection rule related to adaptively routing the portion of the traffic, wherein determining the backend configuration for the fiber optic resource comprises determining the path selection rule, wherein the path selection rule enables the adaptively routing of the portion of the traffic based on a performance of a network according to a defined network performance metric, and wherein the network is external to a customer premises corresponding to the customer premises equipment.

2. The device of claim 1, wherein the endpoint device is located remotely from the customer premises.

3. The device of claim 1, wherein the endpoint device is located at the customer premises.

4. The device of claim 1, wherein the adaptively routing the portion of the traffic comprises routing the portion of the traffic via one fiber optic resource.

5. The device of claim 1, wherein the adaptively routing the portion of the traffic comprises routing the portion of the traffic via selection of one fiber optic resource from a group of fiber optic resources of the backend configuration.

6. The device of claim 1, wherein the path selection rule enables the adaptively routing of the portion of the traffic based on a monetary cost of using the network.

7. The device of claim 1, wherein the frontend configuration and the backend configuration are defined according to a $3^{rd}$ GENERATION PARTNERSHIP PROGRAM standard.

8. The device of claim 1, wherein the customer premises equipment supports the frontend configuration being implemented via a mobile broadband access point of the customer premises.

9. The device of claim 8, wherein the customer premises equipment comprises the mobile broadband access point.

10. The device of claim 1, wherein the customer premises equipment comprises the processor.

11. The device of claim 10, wherein the first received information corresponds to a spectral landscape, and wherein deployment of the frontend configuration causes a portion of available spectrum to be selected, for the mobile broadband resource, based on the spectral landscape indicated in the first received information.

12. The device of claim 11, wherein the mobile broadband resource is a first mobile broadband resource, wherein the first mobile broadband resource is a different mobile broadband resource than a second mobile broadband resource, and wherein the portion of the available spectrum selected for the first mobile broadband resource reduces interference between the first mobile broadband resource and the second mobile broadband resource as a result of the first mobile broadband resource and the second mobile broadband resource employing different frequencies.

13. A method, comprising:
   facilitating, by a processor of a system, receiving information pertinent to configuring a customer premises equipment enabling a mobile broadband frontend and a fiber optic backend supporting communication between a user equipment and an endpoint device;
   configuring, by the system, the mobile broadband frontend of the customer premises equipment based on a first portion of the information;
   configuring, by the system, the fiber optic backend of the customer premises equipment based on a second portion of the information, wherein the fiber optic backend enables steering of user equipment traffic via an optical fiber employed by the customer premises equipment;
   facilitating, by the system, steering a portion of traffic between the user equipment and the endpoint device via a communication path comprising the mobile broadband frontend and the fiber optic backend; and
   updating, by the system in response to receiving updated information that represents an update of the information, a first configuration of the mobile broadband frontend and a second configuration of the fiber optic backend.

14. The method of claim 13, wherein the configuring of the mobile broadband frontend comprises configuring a mobile broadband access point located at a customer premises corresponding to the customer premises equipment, and wherein the configuring of the mobile broadband access point comprises selecting a specified portion of available spectrum based on spectral use information comprised in the information pertinent to the configuring of the customer premises equipment.

15. A non-transitory machine-readable storage medium, comprising executable instructions that, when executed by a processor, facilitate performance of operations, comprising:

configuring a mobile broadband frontend of a customer premises equipment based on a first portion of received information that is determined to be relevant to configuring the customer premises equipment, wherein the mobile broadband frontend enables communication between a mobile device and an endpoint device;

configuring a fiber optic backend of the customer premises equipment based on a second portion of the received information, wherein the fiber optic backend enables the communication between the mobile device and the endpoint device, and wherein the fiber optic backend facilitates adaptively routing mobile device traffic via an optical fiber employed by the fiber optic backend;

routing a portion of traffic between the mobile device and the endpoint device via a communication path in accord with a first configuration of the mobile broadband frontend and a second configuration of the fiber optic backend; and updating a configuration selected from a group of configurations comprising the first configuration of the mobile broadband frontend, the second configuration of the fiber optic backend, and both the first configuration and the second configuration.

16. The non-transitory machine-readable storage medium of claim 15, wherein the configuring of the mobile broadband frontend comprises configuring a mobile broadband access point device at a customer premises corresponding to the customer premises equipment.

17. The non-transitory machine-readable storage medium of claim 15, wherein the first portion of the received information corresponds to a spectral landscape.

18. The non-transitory machine-readable storage medium of claim 17, wherein a deployment of the mobile broadband frontend causes a portion of available spectrum to be selected, for a mobile broadband resource, based on the spectral landscape.

19. The non-transitory machine-readable storage medium of claim 18, wherein the mobile broadband resource is a first mobile broadband resource, and wherein the first mobile broadband resource is a different mobile broadband resource than a second mobile broadband resource.

20. The non-transitory machine-readable storage medium of claim 19, wherein the portion of the available spectrum selected for the first mobile broadband resource reduces interference between the first mobile broadband resource and the second mobile broadband resource as a result of the first mobile broadband resource and the second mobile broadband resource employing different frequencies.

* * * * *